B. GRUTZA.
AUTOMOBILE SIGNAL.
APPLICATION FILED JAN. 24, 1917.
1,250,162.
Patented Dec. 18, 1917.
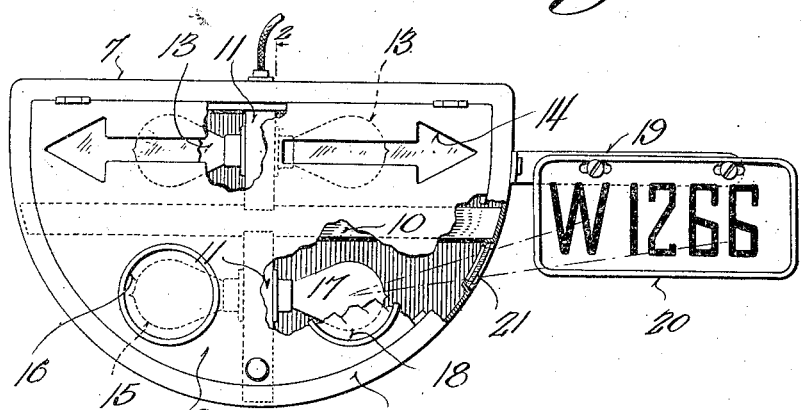
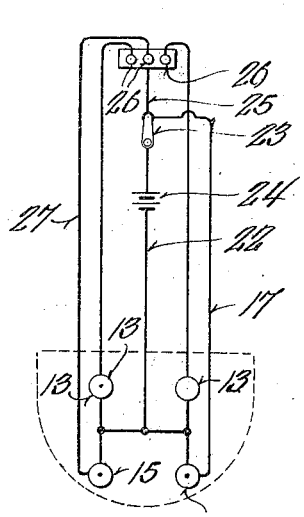
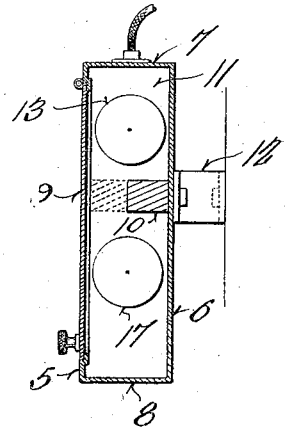
Inventor:
Bernard Grutza

UNITED STATES PATENT OFFICE.

BERNARD GRUTZA, OF MILWAUKEE, WISCONSIN, ASSIGNOR OF ONE-HALF TO ERICH A. NIMMER, OF MILWAUKEE, WISCONSIN.

AUTOMOBILE-SIGNAL.

1,250,162.

Specification of Letters Patent.   Patented Dec. 18, 1917.

Application filed January 24, 1917.   Serial No. 144,146.

*To all whom it may concern:*

Be it known that I, BERNARD GRUTZA, a citizen of the United States, and resident of Milwaukee, in the county of Milwaukee and State of Wisconsin, have invented certain new and useful Improvements in Automobile-Signals; and I do hereby declare that the following is a full, clear, and exact description thereof.

My invention relates to new and useful improvements in signals for automobiles or other vehicles, more particularly of that type embodying a casing and a plurality of signal lamps in the casing adapted for selective actuations to indicate the driver's intention with respect to movement of the vehicle.

It is in general the object of my invention to simplify the structure and improve the efficiency of devices of this character, and it is more specifically an object to provide a signal device including a casing having separate lamp compartments therein which may be manufactured at a minimum cost, and wherein the partitions defining the various lamp chambers form the body frame of the casing.

A further object resides in the provision of a signal device of the present character including a continuously lighted tail lamp so arranged as to provide a positive illumination of the number plate of the vehicle.

With the above and other objects and advantages in view, the invention resides more particularly in the novel combination, formation and arrangement of parts, hereinafter described and pointed out in the accompanying claim.

In the drawings:

Figure 1 is an elevational view of an automobile signal constructed in accordance with my invention.

Fig. 2 is a vertical sectional view through the signal casing on the line 2—2 of Fig. 1.

Fig. 3 is a wiring diagram for the lamps of my improved signal device.

Referring now more particularly to the accompanying drawings, my improved signal device comprises a casing substantially semi-circular in elevation and including front and rear walls 5 and 6 respectively, a top wall 7 and a peripheral wall 8, the front wall 5 having its major portion cut away for the provision of a semi-circular door plate 9 whereby access may be had to the entire interior of the casing. Disposed in crossed relation in the casing is a horizontal partition 10 and a vertical partition 11, the intermediate portion of each partition being recessed to receive the remaining portion of the other partition whereby said partitions are secured together with their side faces disposed in the same planes to fit against the front and rear walls 5 and 6 of the casing. These partitions in the present instance are formed of wooden boards although they may comprise relatively strong metallic members, and in either instance said partitions comprise the body frame of the casing whereby the walls of the casing may be constructed of relatively light material. The partition frame is secured to the body of the vehicle in any desired manner, as by the angular bracket plates 12.

Four compartments are thus formed in the casing and in the two outer compartments are disposed lamps 13 which are adapted to be selectively lighted whereby their rays may shine through arrow shaped openings 14 in the adjacent portions of the door plate 10, to indicate the proposed direction of turning of the vehicle.

In that lower compartment of the casing which is outer-most when attached to a vehicle is disposed a lamp 15 adapted to be selectively lighted whereby its rays may shine through a window 16 in the adjacent portion of the door plate. The glass of said window is preferably green, and the lamp 15 is intended to indicate the driver's intention to stop the vehicle.

Disposed in the remaining lower compartment is a lamp 17 adapted to be continuously lighted to form the tail light of the vehicle and to direct its rays through a red glass window 18 in the adjacent portion of the door plate.

Thus by selectively actuating the various lamps, necessary traffic signals may be clearly imparted to persons in the rear of the vehicle.

Projecting from the inner side of the casing is a bracket bar 19 which is adapted for securement thereto in a conventional manner of the usual number plate 20 of the vehicle is disposed in a plane adjacent the rear wall of the casing. To illumine this number plate, the peripheral wall 8 of the casing is provided at its side thereadjacent with a window 21 through which the white rays of the lamp 17 are directed to thus provide a positive spot illumination for the number plate.

Referring now more particularly to Fig. 3, the wiring for the various lamps and their controlling switches includes a common line 22 branched to extend to all of the lamps from a main switch 23, and including a suitable source of power such as the batteries 24. From the main switch 23 a line extends to the tail lamp 17, and from the switch 23 a second wire 25 extends to a plurality of signal switches 26 from which separate wires 28 extend to the corresponding lamps 13 and 15. Thus, when the main switch 23 is closed, the tail lamp is continuously lighted and the selective lighting of the lamps 13 and 17 is controlled by the switches 16 to momentarily light said lamps to indicate the driver's intentions with respect to movement of the vehicle.

While I have shown and described a preferred embodiment of my invention, it is obvious that changes and modifications of structure may be resorted to without departing in any manner from the spirit of my invention as interpreted by the accompanying claim.

While I have shown a single unit exemplifying my invention, it is manifest that, in practice, one of these combination lamp structures may be attached to the front of the vehicle and one to the back or rear portion whereby a signaling from both ends of the vehicle can be effected, it being obvious that in the adaptation of the combination lamp unit to the front of the vehicle, the continuously lighted lamp 17 may be eliminated. The present signal device is adapted for use in the day time as well as at night, since a sufficient illumination would be provided. Furthermore the present signal being under the operator's direct control may be actuated as soon as desired for turning a corner and may be retained in actuation until after the corner is turned.

What is claimed:

A vehicle signal of the class described comprising, in combination, a hollow casing substantially semi-circular in front elevation and including a flat top wall, a centrally notched horizontal partition extending across the interior of the casing, a vertical partition centrally disposed in the casing and notched to engage the notch of said horizontal partition, whereby the casing is divided into upper and lower pairs of compartments, oppositely extended arrow shaped openings in the outer wall of the casing adjacent the upper pair of compartments, number plate carrying means carried by one side of the casing, a window in the peripheral wall of the casing adjacent the number plate and communicating with one of the lower compartments, a window for each lower compartment in the outer wall of the casing, lamps in all of the compartments, the lamp in the lower compartment having the side window being continuously lighted to provide a tail light and to illuminate the number plate through said window in the peripheral wall of the casing, the window in the outer wall of the casing and communicating with the other lower compartment being colored to designate a stop when the lamp therein is lighted, and the upper compartments designating the direction of travel when the lamps therein are lighted, substantially as described.

In testimony that I claim the foregoing I have hereunto set my hand at Milwaukee, in the county of Milwaukee and State of Wisconsin.

BERNARD GRUTZA.